United States Patent
Yeh et al.

(10) Patent No.: US 9,178,267 B2
(45) Date of Patent: Nov. 3, 2015

(54) PORTABLE ELECTRONIC APPARATUS AND COMPLEX TOUCH MODULE THEREOF

(71) Applicant: Acer Inc., New Taipei (TW)

(72) Inventors: Neng-Wen Yeh, New Taipei (TW); Yung-Sen Lin, New Taipei (TW)

(73) Assignee: Acer Inc., New Taipei ( * ) Notice: Subject to any disclaimer, the term of this patent is extended or adjusted under 35 U.S.C. 154(b) by 189 days.

(21) Appl. No.: 14/068,034

(22) Filed: Oct. 31, 2013

(65) Prior Publication Data

US 2014/0159970 A1   Jun. 12, 2014

(30) Foreign Application Priority Data

Dec. 7, 2012 (TW) ............... 101146169 A

(51) Int. Cl.
   *H01Q 7/00* (2006.01)
   *H01Q 1/22* (2006.01)
   *G06F 3/041* (2006.01)
   *G06F 3/044* (2006.01)
   *H01Q 1/24* (2006.01)

(52) U.S. Cl.
   CPC ............... *H01Q 1/22* (2013.01); *G06F 3/044* (2013.01); *G06F 3/0418* (2013.01); *H01Q 1/243* (2013.01); *H01Q 7/00* (2013.01); *H04M 2250/04* (2013.01); *H04M 2250/22* (2013.01)

(58) Field of Classification Search
   USPC ............ 343/866, 841, 733; 455/129; 345/174
   See application file for complete search history.

(56) References Cited

U.S. PATENT DOCUMENTS

| | | | |
|---|---|---|---|
| 2011/0254807 A1* | 10/2011 | Perski et al. | 345/174 |
| 2011/0273382 A1 | 11/2011 | Yoo et al. | |
| 2012/0034888 A1* | 2/2012 | De Flaviis | 455/129 |
| 2012/0133597 A1 | 5/2012 | Chen | |
| 2012/0146857 A1 | 6/2012 | Wang | |
| 2014/0111474 A1* | 4/2014 | Bytheway | 345/174 |

FOREIGN PATENT DOCUMENTS

JP        2011002948 A     1/2011

* cited by examiner

*Primary Examiner* — Dieu H Duong
(74) *Attorney, Agent, or Firm* — Alan D. Kamrath; Kamrath IP Lawfirm, P.A.

(57) ABSTRACT

A touchpad device includes a capacitive touch pad and a near field communication antenna. The capacitive touch pad includes a plurality of input circuits and a plurality of output circuits. Each input circuit and each output circuit intersect and are arranged substantially perpendicular to each other, thereby forming a chessboard-like circuit. The near field communication antenna includes an antenna structure crosses at least part of the plurality of input circuits and at least part of the plurality of output circuits. The antenna structure is substantially not parallel to any one of the input circuits crossed by the antenna structure, and the near field communication antenna being substantially not parallel to any one of the output circuits crossed by the antenna structure.

12 Claims, 7 Drawing Sheets

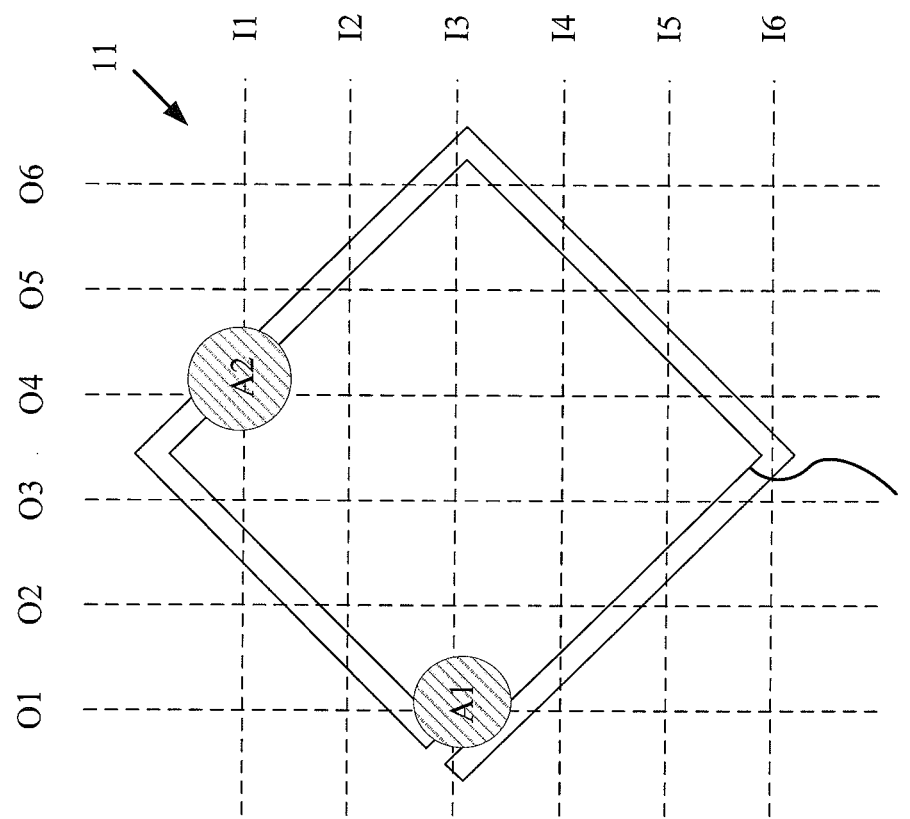

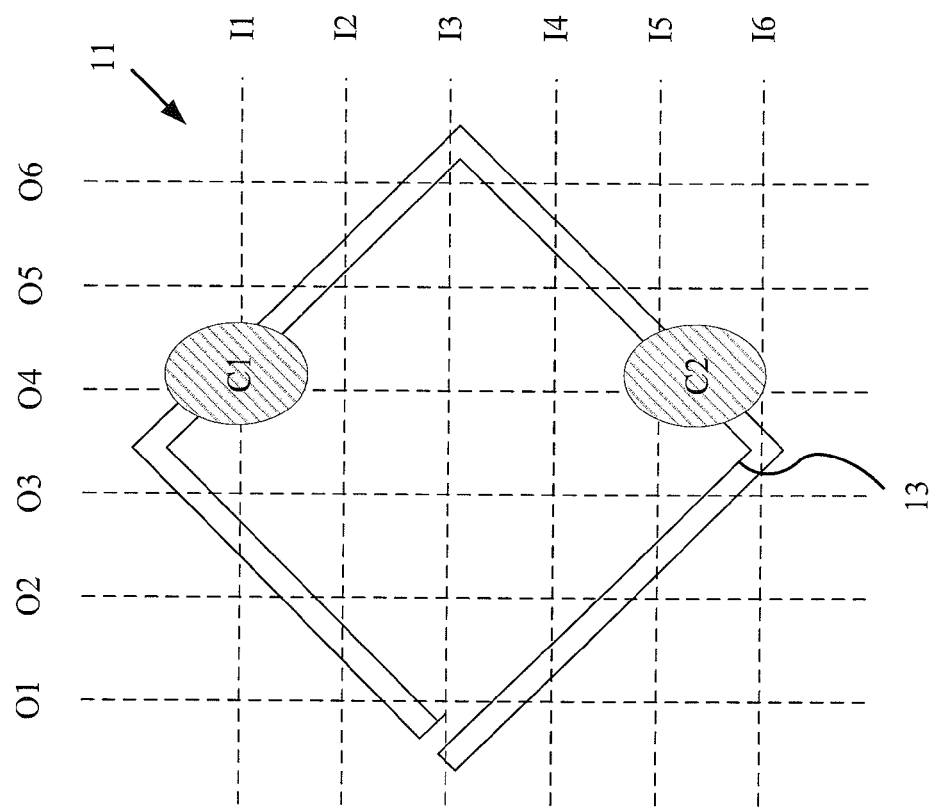

PORTABLE ELECTRONIC APPARATUS AND COMPLEX TOUCH MODULE THEREOF

FIELD

The exemplary embodiment(s) of the present invention relates to a complex touch module. More specifically, relates to a complex touch module having functions of touch control and near field communication, and a portable electronic apparatus using the complex touch module.

BACKGROUND

Using touch control technique to operate portable electronic apparatus has become the main trend technique nowadays. Touch control input function is included in laptops, tablets, smart phones or GPS to execute correspondingly operations. Take the laptop as an example, usually a touch pad is disposed near the keyboard. The user can use the touch pad to execute touch control for replacing mouse or keyboard, so as to provide more intuitive and convenient operation.

Besides, Near Field Communication (NFC) technique is broadly applied for short distance transmission and communication between two apparatuses. For the user's requirements, some manufacturers have combined the NFC technique with the portable apparatus such as a laptop to provide more functions. It has to dispose a corresponding antenna structure and related parts for operating the NFC function, and thus enough space inside the portable apparatus has to be arranged. In the laptop, only the space of the base near the touch pad could be used for disposing the antenna structure and related parts, so that less space inside the laptop is available.

SUMMARY

A main object of the present invention is to provide a complex touch module combines the touch control with near field communication function.

In order to achieve the above object, the complex touch module of the present invention includes a capacitive touch pad and a near field communication antenna. The capacitive touch pad includes a plurality of input circuits and a plurality of output circuits, each input circuit and each output circuit intersect and are arranged substantially perpendicular to each other, thereby forming a chessboard-like circuit. The near field communication antenna comprises an antenna structure stacked on the capacitive touch pad, the antenna structure crosses at least part of the plurality of input circuits and at least part of the plurality of output circuits, and the antenna structure is substantially not parallel to any one of the input circuits crossed by the antenna structure, and the near field communication antenna is substantially not parallel to any one of the output circuits crossed by the antenna structure.

Accordingly, after combining the near field communication antenna with the capacitive touch pad, the complex touch module not only supports the touch control function and the NFC function, but also save the available space inside the portable electronic apparatus when disposing the complex touch module. In addition, the design of the present invention could decrease the disturbing between the NFC antenna and the capacitive touch module.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 4(a) is a schematic diagram of executing the touch control on the complex touch module in accordance with the present invention.

FIG. 4(c) is a schematic diagram of determining the corresponding touch control region toward a touch position A2 in the FIG. 4(b).

DETAILED DESCRIPTION

For facilitating understanding and clarifying the object, characteristics and advantages of the present invention, following specific embodiments and figures of the present invention are presented to make a detail description.

A complex touch module of the present invention could be adapted to a portable electronic apparatus. In following embodiments, a laptop is taken as an example of the portable electronic apparatus, but the present invention is not limited within the example and can be adapted to a tablet, a smart phone or other portable electronic apparatus having touch control function.

Figure 1:
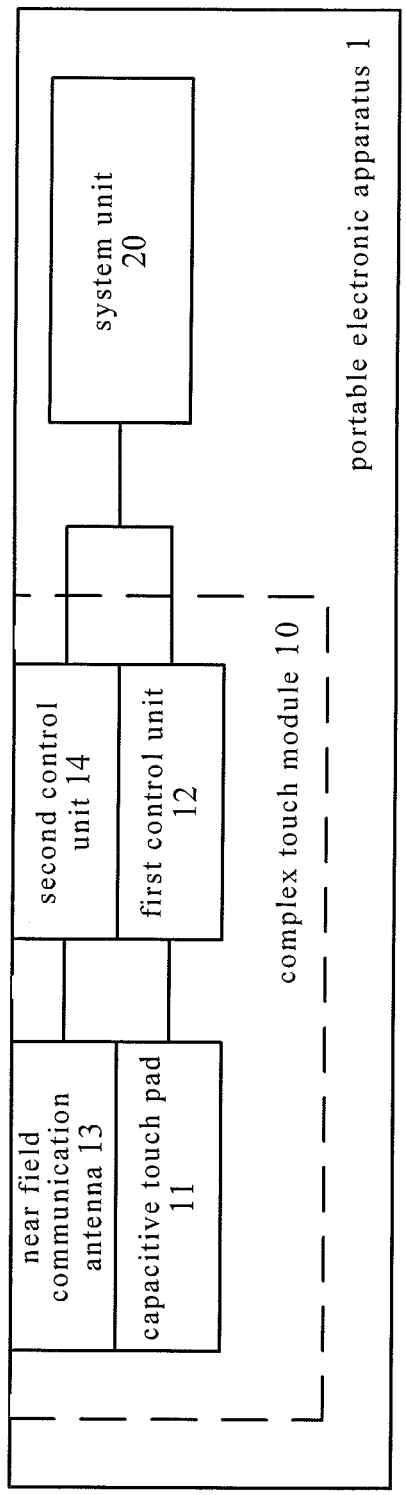
FIG. 1 is a system block diagram of a complex touch module adapted to a portable electronic apparatus in accordance with the present invention.

Please refer to FIG. 1, which is a system block diagram of a complex touch module 10 adapted to a portable electronic apparatus 1 in accordance with the present invention.

As shown in FIG. 1, the complex touch module 10 is applied to the portable electronic apparatus 1. The complex touch module 10 is electrically connected with a system unit 20, so that the system unit 20 receives signals generated by the complex touch module 10 to execute corresponding signal processing. In the present embodiment, the complex touch module 10 of the present invention includes a capacitive touch pad 11, a first control unit 12, a near field communication antenna 13 and a second control unit 14. The capacitive touch pad 11 is electrically connected to the first control unit 12, and the near field communication antenna 13 is electrically connected to the second control unit 14. The first control unit 12 and the second control unit 14 are electrically connected to the system unit 20 respectively. The system unit 20 could include a central processing unit and/or an operation system, etc.

The capacitive touch pad 11 is a plate structure, and a plurality of input/output circuits are disposed thereon and intersected to execute a scan with time division multiplex matrix, so as to sense variances of capacitance values caused by the user's touch. The first control unit 12 obtains the variances of the capacitance values from the capacitive touch pad 11, and determines a corresponding location of the touch on the capacitive touch pad 11 and an operated state of the capacitive touch pad 11. Therefore, the first control unit 12 informs the system unit 20 of the portable electronic apparatus 1 according to a result of the determination to execute a corresponding operation.

The near field communication antenna 13 is combined with the capacitive touch pad 11. In the present embodiment, the near field communication antenna 13 is stacked on the capacitive touch pad 11 to form a whole structure. The near field communication antenna 13 is a loop structure made of metal materials. A magnetic field could be generated by electrifying the near field communication antenna 13. The magnetic field could be varied by using an external apparatus having the same near field communication function to close to the near field communication antenna 13 with a little distance, so as to achieve mutual communication to transmit signals. The second control unit 14 is provided with a control circuit for processing the near field communication signals and storing related data.

Figure 2A:
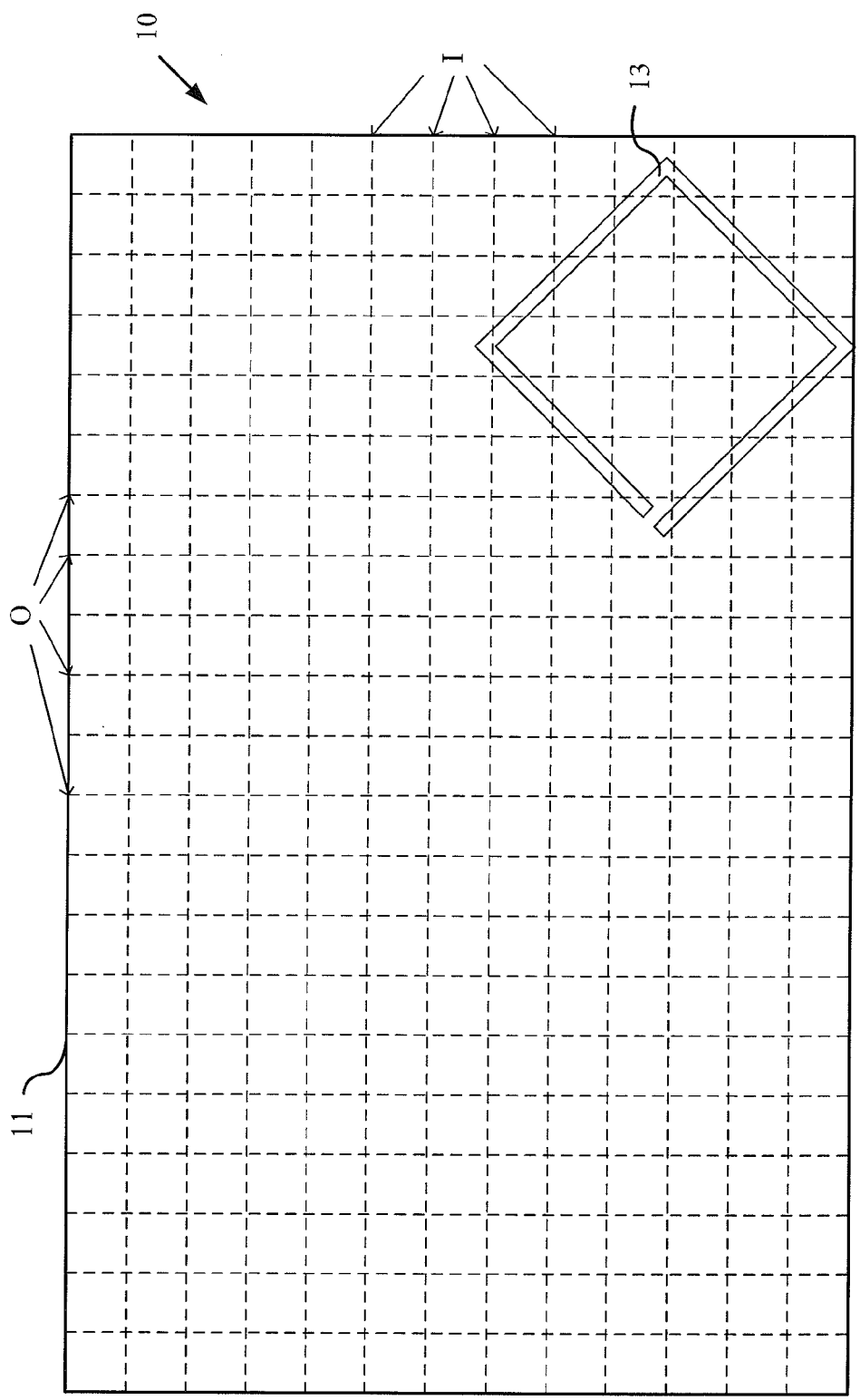
FIG. 2(a) is a schematic diagram of the complex touch module combining a near field communication antenna with a capacitive touch pad in accordance with the present invention.
Figure 2B:
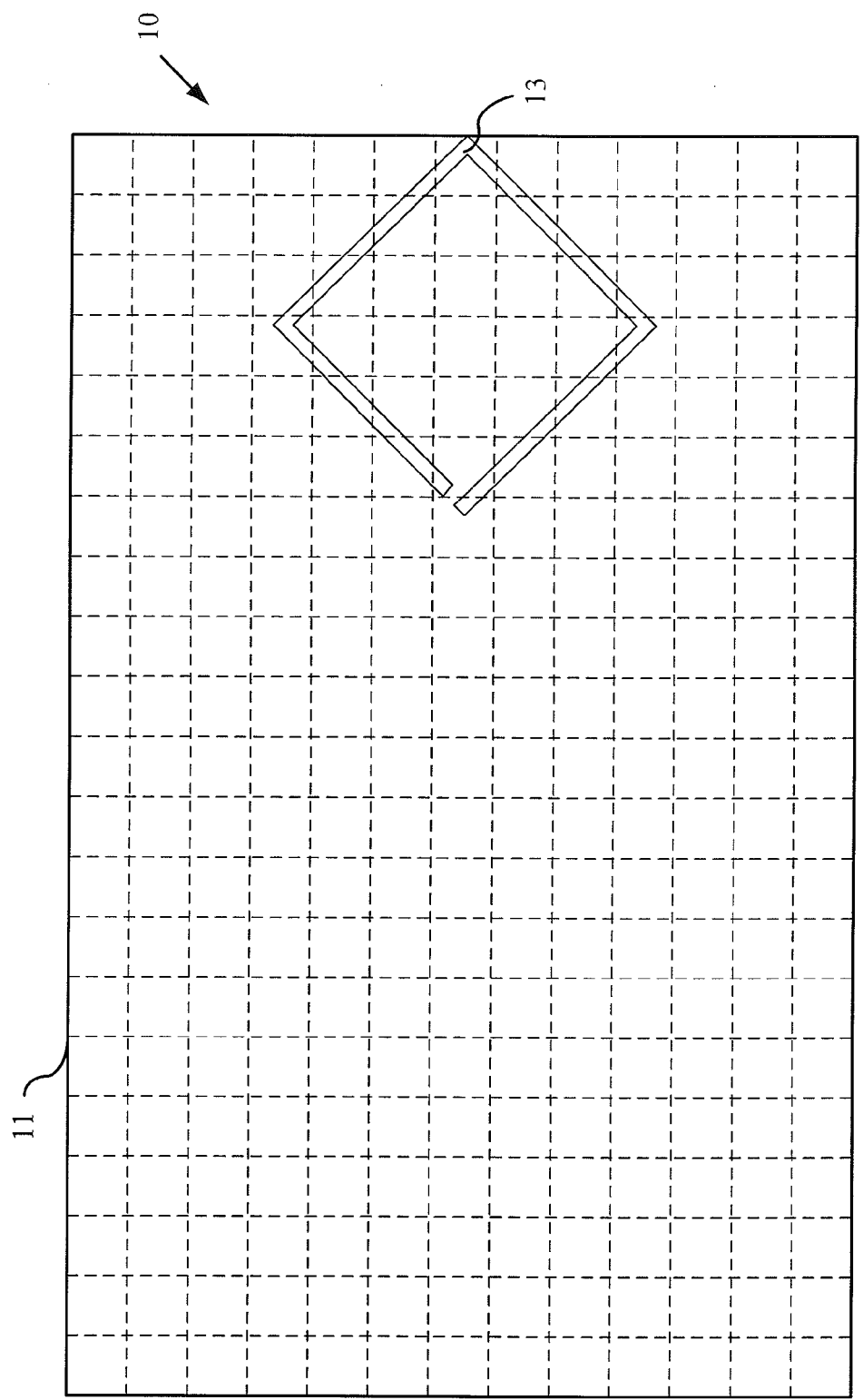
FIG. 2(b) is a schematic diagram of the complex touch module combining the near field communication antenna with the capacitive touch pad at different positions in accordance with the present invention.

Please refer to FIG. 2(a) and FIG. 2(b). FIG. 2(a) is a schematic diagram of the complex touch module 10 combining the near field communication antenna 13 with the capacitive touch pad 11 in accordance with the present invention; FIG. 2(b) is a schematic diagram of the complex touch module 10 combining the near field communication antenna 13 with the capacitive touch pad 11 at different positions in accordance with the present invention.

As shown in FIG. 2(a), the capacitive touch pad 11 includes a plurality of input circuits I and a plurality of output circuits O, which are arranged on a body of the touch pad. Each input circuits I and each output circuits O intersect and are arranged substantially perpendicular to each other, so as to form a chessboard-like circuit. A plurality of intersection sensing points (as intersection points shown in the figure) are formed by the plurality of input circuits I and the plurality of output circuits O. When any one of the intersection sensing points is closed due to the touch, a current signal from the input circuit flows through the intersection sensing point to the output circuit, and the capacitance value would be changed. Therefore, the capacitive touch pad 11 could execute the touch control sensing according to the changed capacitance value to determine a position which is touched by the user and the corresponding operation state.

The near field communication antenna 13 is stacked on the capacitive touch pad 11, and the size of the near field communication antenna 13 could be only part of an area of the capacitive touch pad 11 to avoid affecting the functions of the near field communication antenna 13, i.e. make an area surrounded by the near field communication antenna 13 be less than the area of capacitive touch pad 11. On one hand, it could be avoided that the efficiency of the antenna gets lower due to the loop of the near field communication antenna 13 is too long or the area surrounded by the near field communication antenna 13 is too much. on the other hand, the chance of touching the disposed position of the near field communication antenna 13 could be decreased when the user touches the capacitive touch pad 11. The near field communication antenna 13 crosses at least part of the plurality of input circuits I and at least part of the plurality of output circuits O; in other words, the near field communication antenna 13 would cross at least several input circuits I and output circuits O to provide enough antenna loop for executing the near field communication function, but the present invention is not limited within the examples.

For example, it is assumed that the capacitive touch pad 11 includes a sensing area which is composed of twenty input circuits and twelve output circuits, and the near field communication antenna 13 only crosses the area which is composed of six input circuits and six output circuits. As shown in FIG. 2(a), the near field communication antenna 13 is disposed at a corner position of the capacitive touch pad 11. In addition, the near field communication antenna 13 could also be disposed at a near-side position of the capacitive touch pad 11, as shown in FIG. 2(b). The user generally uses a center part of the capacitive touch pad 11 for executing the corresponding touch. Therefore, by disposing the near field communication antenna 13 at the aforementioned positions, a misjudgment caused by the near field communication antenna 13 could be decreased. However the positions for disposing the near field communication antenna 13 are not limited within the above examples.

Figure 3:
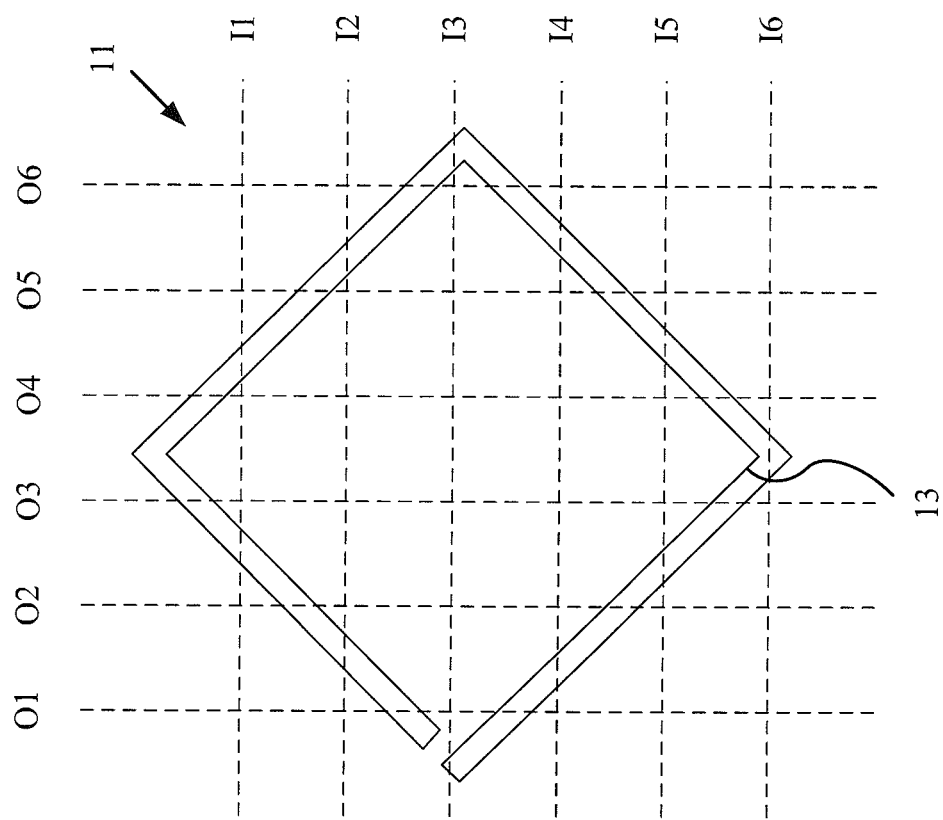
FIG. 3 is a partial schematic diagram of positions which the complex touch module combining the near field communication antenna with the capacitive touch pad in accordance with the present invention.

Please refer to FIG. 3, which is a partial schematic diagram of positions which the complex touch module 11 combining the near field communication antenna 13 with the capacitive touch pad in accordance with the present invention.

As shown in FIG. 3, the complex touch module 10 of the present invention is designed that the near field communication antenna 13 is substantially not parallel to any one of the input circuits crossed by the near field communication antenna 13 (i.e., the near field communication antenna 13 is substantially not perpendicular to any one of the output circuits crossed by the near field communication antenna 13), and the near field communication antenna 13 is substantially not parallel to any one of the output circuits crossed by the near field communication antenna 13 (i.e., the near field communication antenna 13 is substantially not perpendicular to any one of the input circuits crossed by the near field communication antenna 13). In other words, because any two of the input circuits are substantially parallel to each other and any two of the output circuits are substantially parallel to each other, an angle is formed between the near field communication antenna 13 and any one of the input circuits crossed by the near field communication antenna 13 or between the near field communication antenna 13 and any one of the output circuits crossed by the near field communication antenna 13, and the angle is larger than 0 degree and less than 90 degree. Accordingly, an intersection portion of the near field communication antenna 13 and the input circuit (or the output circuit) could form a point contact, and it is avoided that a line contact is formed by the antenna loop and the input circuit (or the output circuit) parallel to the antenna loop formed so as to cause a wide range misjudgment when the user touches the complex touch module 11.

Less the intersection points generated by the near field communication antenna 13 intersecting each input circuit or output circuit, less the misjudgment would be caused by the disturbing of the near field communication antenna 13 when the user touches the complex touch module 11. Thus, in order to further decrease a number of the intersection points generated by the near field communication antenna 13 intersecting each input circuit or output circuit, it is preferred that the number of the intersection points formed by the near field communication antenna 13 crossing any one of the input circuits or the output circuits is less than two when laying out those circuits.

As shown in FIG. 3 again, in one embodiment of the present invention, the near field communication antenna 13 uses a rhombus loop antenna. Due to a rhombus having four sides with slopes, they are substantially not parallel to any one of the input circuits or the output circuits. Besides, spaces are made at the positions of left-up, left-down, right-up and right-down of the near field communication antenna 13 as shown in the figure according to the design of the rhombus antenna.

The rhombus structure of the near field communication antenna 13 not only decreases regions which may affect the touch, but also keeps the communication function of the near field communication antenna 13. Except the aforementioned design, a spherical loop antenna or a polygonal loop antenna could also be used as the design of the near field communication antenna 13.

As described above, the near field communication antenna 13 is disposed crossing the several input circuits and output circuits, and those input circuits and output circuits which are crossed by the near field communication antenna 13 would intersect to form the plurality of intersection sensing points. Therefore, in one embodiment of the present invention, the near field communication antenna 13 is arranged to avoid the positions of the plurality of intersection sensing points, so that the near field communication antenna 13 does not cross any one of the plurality of intersection sensing points. Accordingly, when the user touches the capacitive touch pad 11, the effect made by the near field communication antenna 13 to those intersection sensing points which are not adjacent to the touch could be lowered, and the possibility of signal misjudging by the system could be decreased.

Figure 4B:
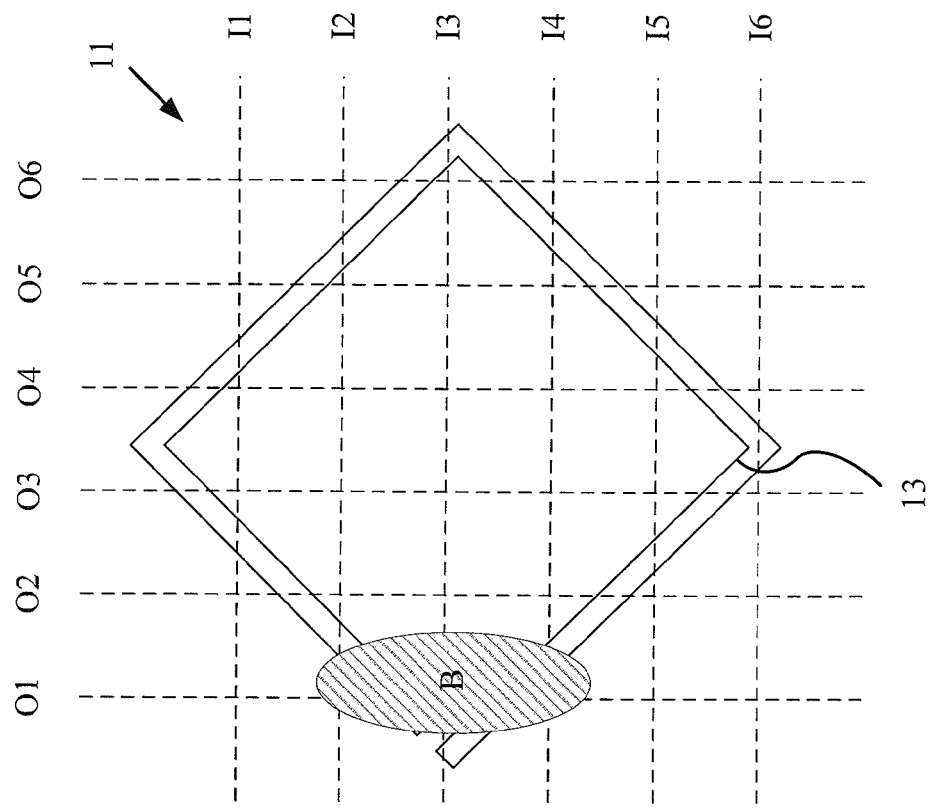
FIG. 4(b) is a schematic diagram of determining the corresponding touch control region toward a touch position A1 in the FIG. 4(a).

Please refer to FIG. 4(a) to FIG. 4(c) at the same time. FIG. 4(a) is a schematic diagram of executing the touch control on the complex touch module in accordance with the present invention; FIG. 4(b) is a schematic diagram of determining the corresponding touch control region toward a touch position A1 in the FIG. 4(a); FIG. 4(c) is a schematic diagram of determining the corresponding touch control region toward a touch position A2 in the FIG. 4(b).

As shown in FIG. 4(a) and the above embodiment, it is assumed that the complex touch module 10 of the present invention uses the near field communication antenna 13 which is the rhombus loop antenna, and the near field communication antenna 13 is stacked on the capacitive touch pad 11. The near field communication antenna 13 only crosses the area composed of six input circuits (I1~I6) and six output circuits (O1~O6) on the capacitive touch pad 11. By the matrix scanning design with time division multiplex, the capacitive touch pad 11 would scan all input circuits sequentially (i.e. scan with the order I1-I2-I3 . . . ), thus only single input circuit is scanned at the same time. When the user touches at a point A1, the electric field signal generated from the output circuit O1 would be conducted through the point A1 by the loop design of the near field communication antenna 13, and the system would misjudge and determine the contacting position to be the larger area B as shown in FIG. 4(b) when scanning the output circuit O1. Due to a signal strength of the conducted electric field signal decays with its conducting distance, and the near field communication antenna 13 does not intersect any one of the intersection sensing points, the first control unit (not shown in the figure) could determine that the real contacting position is near the intersection sensing point of the output circuit O1 and input circuit I3 according to the signal strength of the conducted electric field signal; thus, the misjudgment could be reduced.

Further, as shown in FIG. 4(a) and FIG. 4(c), using the same antenna loop design of the near field communication antenna 13 in accordance with the abovementioned embodiment. It is assumed that the user touches at a point A2, the electric field signal generated from the output circuit O1 would be conducted through the point A2 by the loop design of the near field communication antenna 13, and the system would misjudge and determine the contacting position to be different areas C1 and C2 as shown in FIG. 4(c) when scanning the output circuit O1. The first control unit could compare the signal strengths in the area C1 and C2 to determine that the real contacting position is area C1, which is near the intersection sensing point of the output circuit O1 and input circuit I1.

The present invention further includes a portable electronic apparatus 1. The portable electronic apparatus includes a main body 30 and the complex touch module 10 aforementioned described, and the complex touch module 10 is combined with the main body 30. Thus, the portable electronic apparatus 1 could provide double functions of touch control input and near field communication by the aforementioned described complex touch module 10.

In summary, regardless of the function, way and result of the present invention are shown different technical characteristics to prior arts, and it is a great break. Examiners would be appreciated to allow this patent after realizing the content of the present invention so as to benefit the society. However, the aforementioned embodiments are just for illustrating the principle and the result of the present invention, but not for limiting the range of the present invention. It will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A complex touch module, including:
   a capacitive touch pad, including a plurality of input circuits and a plurality of output circuits, each input circuit and each output circuit intersecting and being arranged substantially perpendicular to each other, thereby forming a chessboard-like circuit; and
   a near field communication antenna, stacked on the capacitive touch pad, the near field communication antenna crossing at least part of the plurality of input circuits and at least part of the plurality of output circuits, and the near field communication antenna being substantially not parallel to any one of the input circuits crossed by the near field communication antenna, and the near field communication antenna being substantially not parallel to any one of the output circuits crossed by the near field communication antenna.

2. The complex touch module as claim 1, wherein the near field communication antenna forms a rhombus loop antenna, a spherical loop antenna or a polygonal loop antenna.

3. The complex touch module as claim 1, wherein an area surrounded by the near field communication antenna is less than an area of the capacitive touch pad.

4. The complex touch module as claim 1, wherein the near field communication antenna is located at a corner position or a near-side position of the capacitive touch pad.

5. The complex touch module as claim 1, wherein a plurality of intersection sensing points are formed by the at least part of the plurality of input circuits crossed by the near field communication antenna and the at least part of the plurality of output circuits crossed by the near field communication antenna, and any one of the plurality of intersection sensing points is not crossed by the near field communication antenna.

6. The complex touch module as claim 1, wherein a number of intersection points formed by the near field communication antenna and any one of the input circuits crossed by the near field communication antenna or any one of the output circuits crossed by the near field communication antenna is equal to or less than two.

7. A portable electronic apparatus, including:
a main body, and
a complex touch module, combined with the main body, the complex touch module including:
a capacitive touch pad, including a plurality of input circuits and a plurality of output circuits, each input circuit and each output circuit intersecting and being arranged substantially perpendicular to each other, thereby forming a chessboard-like circuit; and
a near field communication antenna, stacked on the capacitive touch pad, the near field communication antenna crossing at least part of the plurality of input circuits and at least part of the plurality of output circuits, and the near field communication antenna being substantially not parallel to any one of the input circuits crossed by the near field communication antenna, and the near field communication antenna being substantially not parallel to any one of the output circuits crossed by the near field communication antenna.

8. The portable electronic apparatus as claim 7, wherein the near field communication antenna forms a rhombus loop antenna, a spherical loop antenna or a polygonal loop antenna.

9. The portable electronic apparatus as claim 7, wherein an area surrounded by the near field communication antenna is less than an area of the capacitive touch pad.

10. The portable electronic apparatus as claim 7, wherein the near field communication antenna is located at a corner position or a near-side position of the capacitive touch pad.

11. The portable electronic apparatus as claim 7, wherein a plurality of intersection sensing points are formed by the at least part of the plurality of input circuits crossed by the near field communication antenna and the at least part of the plurality of output circuits crossed by the near field communication antenna, and any one of the plurality of intersection sensing points is not crossed by the near field communication antenna.

12. The portable electronic apparatus as claim 7, wherein a number of intersection points formed by the near field communication antenna and any one of the input circuits crossed by the near field communication antenna or any one of the output circuits crossed by the near field communication antenna is equal to or less than two.

* * * * *